United States Patent
Heon et al.

(10) Patent No.: US 9,321,661 B2
(45) Date of Patent: Apr. 26, 2016

(54) MAGNETIC PARTICLE CONTROL SYSTEM AND A METHOD FOR CONTROLLING MAGNETIC PARTICLE USING THEREOF

(71) Applicant: KOREA INSTITUTE OF SCIENCE AND TECHNOLOGY, Seoul (KR)

(72) Inventors: Lee Seock Heon, Seoul (KR); Na Yong Hun, Seoul (KR); Yang Seung Heun, Hwaseong-si (KR)

(73) Assignee: Korea Institute of Science and Technology, Seoul (KR)

( * ) Notice: Subject to any disclaimer, the term of this patent is extended or adjusted under 35 U.S.C. 154(b) by 494 days.

(21) Appl. No.: 13/755,473

(22) Filed: Jan. 31, 2013

(65) Prior Publication Data

US 2014/0131282 A1    May 15, 2014

(30) Foreign Application Priority Data

Nov. 12, 2012 (KR) .......................... 10-2012-0127518

(51) Int. Cl.
| | |
|---|---|
| C02F 1/44 | (2006.01) |
| C02F 1/48 | (2006.01) |
| B01D 61/00 | (2006.01) |

(52) U.S. Cl.
CPC .............. *C02F 1/445* (2013.01); *B01D 61/002* (2013.01); *C02F 1/48* (2013.01); *B01D 2311/2607* (2013.01); *C02F 2305/08* (2013.01)

(58) Field of Classification Search
CPC ........ C02F 1/445; C02F 1/48; C02F 2305/08; B01D 61/002; B01D 2311/2607
See application file for complete search history.

(56) References Cited

U.S. PATENT DOCUMENTS

| | | | |
|---|---|---|---|
| 2007/0278153 A1* | 12/2007 | Oriard ................. | B01D 61/002 210/205 |
| 2014/0076809 A1* | 3/2014 | Lee ........................ | C02F 1/445 210/222 |

* cited by examiner

*Primary Examiner* — David A Reifsnyder
(74) *Attorney, Agent, or Firm* — NSIP Law

(57) ABSTRACT

The invention relates a magnetic particle control system positioning a magnetic particle (or magnetic particles) at a specific area, and more particular, to a magnetic particle control system including at least two magnets apart from each other, wherein a magnetic particle is positioned at a specific area between the at least two magnets by a repulsive force between the magnets. According to the exemplary embodiment of the invention, the magnetic particle can be consistently positioned at a wanted area by the at least two magnets with the same poles facing each other. Accordingly, the magnetic particle can be effectively controlled by arbitrarily adjusting the position of the magnets.

7 Claims, 1 Drawing Sheet

MAGNETIC PARTICLE CONTROL SYSTEM AND A METHOD FOR CONTROLLING MAGNETIC PARTICLE USING THEREOF

CROSS-REFERENCE TO RELATED APPLICATION

This application claims priority to and the benefit of Korean Patent Application No. 10-2012-0127518 filed in the Korean Intellectual Property Office on Nov. 12, 2012, the entire contents of which are incorporated herein by reference.

BACKGROUND OF THE INVENTION (a) Field of the Invention

The invention relates to a magnetic particle control system positioning a magnetic particle (or magnetic particles) at a specific area and effectively controlling the magnetic particle.

(b) Description of the Related Art

In a water treatment process for purifying wastewater or for freshening or desalting seawater, a membrane separation process using membrane filtration is recently receiving attention. The membrane separation process separates pollutants and purified water in feed water through a physical mechanism. A process using forward osmosis among membrane separation processes can minimize energy consumption, compared to the other membrane separation processes. Accordingly, a lot of research on the process using the forward osmosis has been widely performed.

In the membrane separation process using the forward osmosis, in order to separate the pollutants and the purified water in the feed water, osmotic pressure is generated by using a draw solution having chemical concentration higher than the feed water. The purified water and the draw solution are gathered or collected by the forward osmosis. In this instance, NaCl is generally used for the draw solution. Also, a device for separating the draw solution and the purified water is installed, and a process using reverse osmosis is used in the device.

Therefore, due to the installation and the operation of the device for separating the draw solution and the purified water, economic efficiency and energy efficiency may decrease.

In order to solve the problems, the draw solution including magnetic osmotic-induced particle for drawing the purified water and a magnetic device for drawing the magnetic osmotic-induced particle are used. Then, economic efficiency can be raised and energy consumption can be minimized, compared to the other separation processes.

However, when the draw solution uses the magnetic osmotic-induced particle for drawing the purified water as a draw solute in the process using the forward osmosis, the magnetic osmotic-induced particle is adhered to a surface of a separation membrane by its property. Thus, pollution of the membrane due to the draw solution may be induced, and thus, a water permeation flux or speed may rapidly decrease in a short time in the process using the forward osmosis.

The above information disclosed in this Background section is only for enhancement of understanding of the background of the invention and therefore it may contain information that does not form the prior art that is already known in this country to a person of ordinary skill in the art.

SUMMARY OF THE INVENTION

The invention has been made in an effort to provide an apparatus for positioning a magnetic particle (magnetic particles) stably at a wanted area and a method for effectively controlling the magnetic particle by using the same.

Particularly, an embodiment of the invention is directed to a water treatment system of a forward-osmosis type. The water treatment system of the forward-osmosis type uses a draw solution including a magnetic particle as a draw solute. In the water treatment system, pollution of a separation membrane generated by the adhesion of the magnetic particle used as the draw solute can be prevented, and a flux of the water treatment system of the forward-osmosis type can be maintained over certain level for a long time.

An aspect of the invention relates to a magnetic particle control system positioning a magnetic particle at a specific area, and more particular, to a magnetic particle control system including at least two magnets apart from each other, wherein a magnetic particle is positioned at a specific area between the at least two magnets by a repulsive force between the magnets.

The magnet of the embodiment of the invention is an element being magnetic. Thus, any elements for generating the repulsive force (that is, repelling force) to each other when they are positioned with the same poles facing each other may be used for the magnets. For example, the magnet may include a permanent magnet or an electromagnet.

A particle size of the magnetic particle according to the invention is not limited, and any size magnetic particle such as a magnetic nano particle having nano size or a magnetic particle having micro size may be used.

Yet another aspect of the invention relates to a magnetic particle control method using the magnetic particle control system, wherein the magnetic particle is positioned at a specific area for a period of time.

Yet another aspect of the invention relates to a water treatment system of a forward osmosis type. The water treatment system includes a forward osmosis module being divided into a feed-water side and a draw-solution side by a separation membrane, and uses a draw solution including a magnetic particle as an osmotic-induced solute. A first magnet is positioned at one area of the feed-water side of the forward osmosis module, and a second magnet is positioned at one area of the draw-solution side of the forward osmosis module. A distance between the first magnet and the separation membrane of the forward osmosis module is larger than a distance between the second magnet and the separation membrane of the forward osmosis module. The magnetic particle in the draw solution is positioned apart from the separation membrane by a repulsive force between the first magnet and the second magnet.

In the water treatment system of the forward osmosis type according to the embodiment of the invention, the first magnet includes an element being magnetic. Thus, any elements for generating the repulsive force (that is, repelling force) to each other when they are positioned with the same poles facing each other may be used for the first magnet. For example, the first magnet includes a permanent magnet or an electromagnet. Also, the embodiment of the invention is not limited to the position of the first magnet. Thus, the first magnet is positioned at one area of the feed-water side of the forward osmosis module. Preferably, the first magnet may be positioned at one area outside the feed-water side of the forward osmosis module. The position change of the first magnet is necessary depending on a pollution degree of the feed water flowing into the feed-water side of the forward osmosis module. This is because the position adjustment of the first magnet is not easy if the first magnet may be positioned at one area inside the feed-water side of the forward osmosis module.

In the water treatment system of the forward osmosis type according to the embodiment of the invention, the second magnet is an element being magnetic. Thus, any elements for generating the repulsive force (that is, repelling force) to each other when they are positioned with the same poles facing each other may be used for the second magnet. For example, the second magnet includes a permanent magnet or an electromagnet. Also, the embodiment of the invention is not limited to the position of the second magnet. Thus, the second magnet is positioned at one area of the draw-solution side of the forward osmosis module. Preferably, the second magnet may be positioned at one area inside the draw-solution side of the forward osmosis module.

In the water treatment system of the forward osmosis type according to the embodiment of the invention, a particle size of the magnetic particle according to the invention is not limited, and any size magnetic particle such as a magnetic nano particle having nano size or a magnetic particle having micro size may be used.

Still another aspect of the invention relates to a control method of the water treatment system of the forward osmosis type. In the method, the magnetic particle is positioned apart from the separation membrane for a period of time and a flux is maintained over certain level by using the water treatment system of the forward osmosis type.

According to the exemplary embodiment of the invention, the magnetic particle can be stably positioned at a wanted area and the magnetic particle can be effectively controlled by arbitrarily adjusting the position of the magnets.

Particularly, in the water treatment system of the forward-osmosis type using the magnetic particle as the draw solute according to the exemplary embodiment of the invention, pollution of the separation membrane generated by the adhesion of the magnetic particle used as the draw solute can be prevented, and a flux of the water treatment system of the forward-osmosis type can be maintained over certain level for a long period of time.

DETAILED DESCRIPTION OF THE EMBODIMENTS

Figure 1:
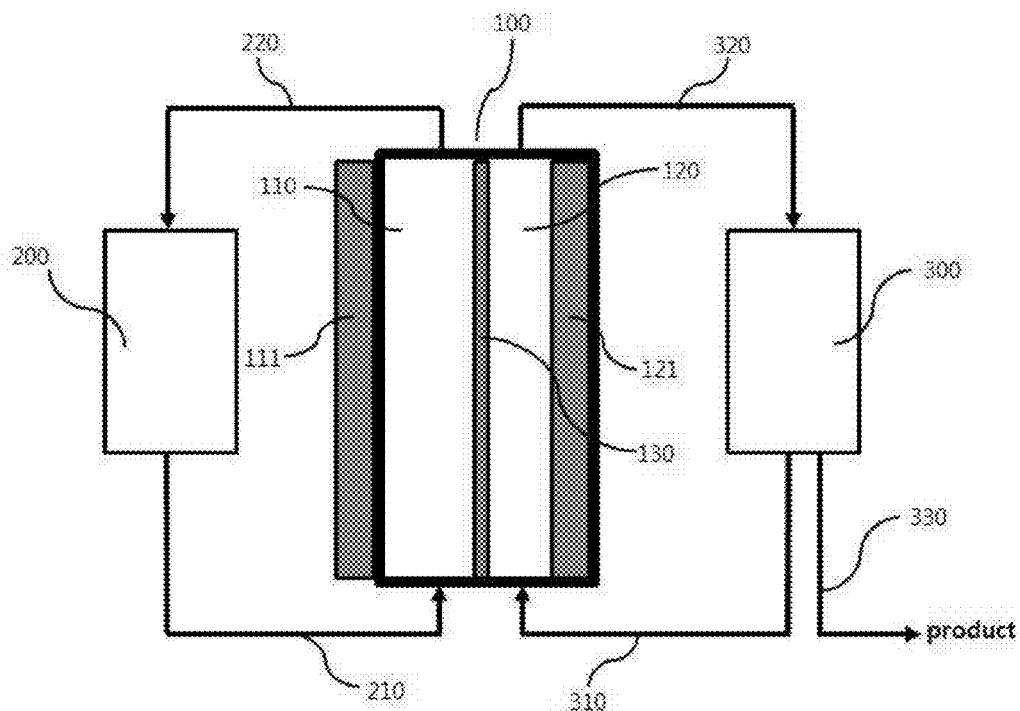
FIG. 1 is a block diagram of a water treatment system of a forward osmosis type according to an embodiment of the invention.

Hereinafter, an embodiment of the invention will be described in detail.

An embodiment of the invention relates to a magnetic particle control system positioning a magnetic particle at a specific area. More particularly, a magnetic particle control system includes at least two magnets apart from each other. In the magnetic particle control system, a magnetic particle (or magnetic particles) is positioned at a specific area between the magnets by a repulsive force between the magnets. When the at least two magnets are positioned with the same poles facing each other, the repulsive force is applied between the magnets. Thus, when one or more magnetic particle is positioned between the magnets, the repulsive force from the magnets is applied to the magnetic particle, and thus, the magnetic particle can be positioned at a specific area. The magnetic particle can be continuously positioned at the specific area when the repulsive force of the magnets is continuously applied.

Also, the location of the magnetic particle can be changed by changing the position of the magnets. Particularly, when distances between the magnetic particle and the magnets are not the same by changing the position of the magnets, the magnetic particle is drawn or pulled toward one magnet closer to the magnetic particle than another magnet. The magnetic particle moves toward the magnet closer to the magnetic particle than another magnet. This is because an attractive force applied to the magnetic particle generated by one magnet closer to the magnetic particle is larger than that generated by another magnet when the magnetic particle is positioned at the specific area by the repulsive force between the magnets with same poles facing each other.

The magnetic particle control system according to the embodiment of the invention can be applied to various fields where the control of the magnetic particle is needed. For example, in a water treatment field of a forward osmosis type using a draw solution including a magnetic particle used as a draw solute, the magnetic particle control system may be applied to control the position of the magnetic particle as the draw solute. Also, the magnetic particle control system may be used in a cell image field and a biomedical area that a targeted delivery approach method is necessary. The targeted delivery approach method treats or destructs a target cell or tissue by accurately delivering a drug to a cell or a lesion site in a short time through using the magnetic particle.

The magnet of the embodiment of the invention is an element being magnetic. Thus, any elements for generating the repulsive force (that is, repelling force) to each other when they are positioned with the same poles facing each other may be used for the magnets. For example, the magnet includes a permanent magnet or an electromagnet.

The magnetic particle according to an embodiment of the invention can be a paramagnetic particle, a super-paramagnetic particle or a ferromagnetic particle. For the magnetic particle, an iron oxide ($Fe_2O_3$, $Fe_3O_4$), ferrite (one Fe of $Fe_3O_4$ is replaced with another magnetic-related element, for example, $CoFe_2O_4$, $MnFe_2O_4$, and so on), an alloy (alloying with a precious metal for preventing an oxidation of the magnetic element and for enhancing conductivity and stability, for example, FePt, CoPt, and so on), the magnetic particle of a core-shell structure that a hydrophilic material is coated on an iron oxide in order to enhance dispersibility and hydrophilicity of the magnetic particle (for example, the magnetic particle of the core-shell structure is citrate-coated $Fe_3O_4$), and so on may be used. A kind of the magnetic particle of the invention is not limited, and any kind magnetic particle may be used. In addition, a particle size of the magnetic particle according to the invention is not limited, and any size magnetic particle such as a magnetic nano particle having nano size or a magnetic particle having micro size may be used.

Another aspect of the invention relates to a magnetic particle control method positioning a magnetic particle at a specific area for a period of time by the magnetic particle control system.

Yet another aspect of the invention relates to a water treatment system of a forward osmosis type. The water treatment system includes a forward osmosis module being divided into a feed-water side and a draw-solution side by a separation membrane, and uses a draw solution including a magnetic particle as an osmotic-induced solute. A first magnet is positioned at one area of the feed-water side of the forward osmosis module, and a second magnet is positioned at one area of the draw-solution side of the forward osmosis module. A distance between the first magnet and the separation membrane of the forward osmosis module is larger than a distance between the second magnet and the separation membrane of the forward osmosis module. The magnetic particle in the draw solution is positioned apart from the separation membrane by a repulsive force between the first magnet and the second magnet.

In the water treatment system of the forward osmosis type according to the embodiment of the invention, the first magnet is positioned at one area of the feed-water side of the forward osmosis module, and the second magnet is positioned at one area of the draw-solution side of the forward osmosis module. Then, the repulsive force between the first magnet and the second magnet is applied to the magnetic particle used as the draw solute, and the magnetic particle is continuously positioned at the specific area. However, if the distance between the first magnet and the separation membrane of the forward osmosis module is the same as the distance between the second magnet and the separation membrane of the forward osmosis module, the magnetic particle used as the draw solute will be positioned at the separation member of the forward osmosis module. Therefore, the magnetic particle used as the draw solute is adhered to a surface of the separation membrane and blocks the flow of the water, thereby reducing the flux of the water treatment system of the forward osmosis type. Accordingly, the distance between the first magnet and the separation membrane of the forward osmosis module is different from the distance between the second magnet and the separation membrane of the forward osmosis module in the embodiment of the invention. Particularly, the distance between the first magnet and the separation membrane of the forward osmosis module is larger than the distance between the second magnet and the separation membrane of the forward osmosis module so that the magnetic particle used as the draw solute can be apart from the surface of the separation membrane toward the draw-solution side. That is, since the distance between the second magnet and the separation membrane is relatively small, the magnetic particle used as the draw solute positioned between the first magnet and the second magnet is more affected by an attractive force of the second magnet that is relatively close. Thus, the magnetic particle moves toward the second magnet. Accordingly, the magnetic particle used as the draw solute is continuously positioned apart from the surface of the separation membrane toward the draw-solution side. When the magnetic particle used as the draw solute is continuously apart from the separation membrane, the conventional problem that the magnetic particle is adhered to the separation membrane and blocks the flow of the water from the feed-water side can be solved. Thus, the flux of the water treatment system of the forward osmosis type can be maintained over certain level for a long period of time.

In the water treatment system of the forward osmosis type according to the embodiment of the invention, the feed-water side is a space of the forward osmosis module where the outside feed water flows, and the draw-solution side is a space of the forward osmosis module where the draw solution for inducing the osmotic pressure flows. The separation membrane is a membrane used for the water treatment system of the forward osmosis type. In the water treatment system of the forward osmosis type according to the embodiment of the invention, it is needed that the water flows from the feed-water side to the draw-solution side through the separation membrane. Thus, a hydrophilic membrane having high permeability of water in an osmotic direction may be preferably used for the separation membrane. The separation membrane generally used for the forward osmosis module is formed of a CA (cellulose acetate) membrane, and a PA (polyamide) membrane or a TFC (thin film composite) membrane. The separation membrane includes an active layer for excluding salt and a supporting layer for supporting the active layer. A separation membrane made of CTA (cellulose triacetate) made by Hydration Technology Inc. (HTI) of the United States of America is a representative commercialized separation membrane used for the forward osmosis module.

The draw solution generates the osmotic pressure higher than that of the feed water at the feed-water side of the forward osmosis module. Therefore, the osmotic pressures are different at both sides of the separation membrane of the forward osmosis module, and it makes the water flow from the feed-water side of relatively low osmotic pressure to the draw-solution side of relatively high osmotic pressure. Particularly, in the water treatment system of the forward osmosis type according to the embodiment of the invention, the draw solute of the draw solution is the magnetic particle.

In the water treatment system of the forward osmosis type according to the embodiment of the invention, the first magnet is an element being magnetic. Thus, any elements for generating the repulsive force (that is, repelling force) to each other when they are positioned with the same poles facing each other may be used for the first magnet. For example, the first magnet includes a permanent magnet or an electromagnet. Also, the embodiment of the invention is not limited to the position of the first magnet. Thus, the first magnet is positioned at one area of the feed-water side of the forward osmosis module. Preferably, the first magnet may be positioned at one area outside the feed-water side of the forward osmosis module. The position change of the first magnet is necessary depending on a pollution degree of the feed water flowing into the feed-water side of the forward osmosis module. This is because the position adjustment of the first magnet is not easy if the first magnet may be positioned at one area inside the feed-water side of the forward osmosis module.

In the water treatment system of the forward osmosis type according to the embodiment of the invention, the second magnet is an element being magnetic. Thus, any elements for generating the repulsive force (that is, repelling force) to each other when they are positioned with the same poles facing each other may be used for the second magnet. For example, the second magnet includes a permanent magnet or an electromagnet. Also, the embodiment of the invention is not limited to the position of the second magnet. Thus, the second magnet is positioned at one area of the draw-solution side of the forward osmosis module. Preferably, the second magnet may be positioned at one area inside the draw-solution side of the forward osmosis module. If the second magnet is positioned at one area outside the draw-solution, the forward osmosis module acts as a kind of barrier and an influence of a magnetic force generated from the second magnet decreases. Thus, the attractive force applied to the magnetic particle used as the draw solute is reduced. Accordingly, an effect of separating the magnetic particle from the separation membrane may be not sufficient. In addition, if the second magnet is positioned at the inside of the draw-solution side of the forward osmosis module, the magnetic particle used as the draw solute can be apart from the separation membrane at an adjacent portion of the separation membrane, thereby maximizing the osmotic-induced effect of the magnetic particle.

In the water treatment system of the forward osmosis type according to the embodiment of the invention, a particle size of the magnetic particle according to the invention is not limited, and any size magnetic particle such as a magnetic nano particle having nano size or a magnetic particle having micro size may be used.

Still another aspect of the invention relates to a control method of the water treatment system of the forward osmosis type. In the method, the magnetic particle is positioned apart from the separation membrane for a period of time and a flux is maintained over certain level by using the water treatment system of the forward osmosis type.

Hereinafter, the invention will be described in more detail through an embodiment of the invention. However, the following embodiment is an example for describing the invention, and the invention is not limited thereto.

Embodiment

An embodiment of the invention will be described with reference to an accompanying drawing.

FIG. 1 is a block diagram of a water treatment system of a forward osmosis type according to an embodiment of the invention.

As shown in FIG. 1, a water treatment system of a forward osmosis type according to an embodiment of the invention includes a forward osmosis module 100, a feed water tank 200, and a draw-solution separation device 300. The forward osmosis module 100 includes a feed-water side 110 where feed water flows from the outside, a draw-solution side 120 where a draw solution flows from the outside, and a separation membrane 130 for a forward osmosis.

As shown in FIG. 1, a first magnet 111 is positioned at an outer surface of the feed-water side 110 of the forward osmosis module 100, and a second magnet 121 is positioned at an inner surface of the draw-solution side 120 of the forward osmosis module 100. Accordingly, a distance between the first magnet 111 and the separation membrane 130 for the forward osmosis is larger than a distance between the second magnet 121 and the separation membrane 130 for the forward osmosis.

Hereinafter, an operation process of the water treatment system of the forward osmosis type according to the embodiment will be described through the block diagram shown in FIG. 1.

First, feed water in the feed water tank 200 flows into the feed-water side 110 of the forward osmosis module 100 through a feed-water inlet 210, and the draw solution including a magnetic particle used as a draw solute simultaneously flows into the draw-solution side 120 of the forward osmosis module 100 from the draw-solution separation device 300 through a draw-solution inlet 310.

When the feed water and the draw solution flow into the forward osmosis module 100, water in the feed water flows into the draw-solution side 120 by penetrating the separation membrane 130 for the forward osmosis because the draw solution has the osmotic pressure higher than that of the feed water. In this instance, a repulsive force between the first magnet 111 and the second magnet 121 facing each other is applied to the magnetic particle used as the draw solute and included in the draw solution. At the same time, the magnetic particle in the draw solution of the forward osmosis module 100 is positioned to be apart from the separation membrane 130 for the forward osmosis toward the second magnet 121. This is because the second magnet 121 is positioned at the inner surface of the draw-solution side 120 of the forward osmosis module 100 and is closer to the separation membrane 130 than the first magnet 111, and thus, an attractive force applied to magnetic particle used as the draw solute by the second magnet 121 is larger than that by the first magnet 111. Accordingly, in the water treatment system of the forward osmosis type according to the embodiment of the invention, the magnetic particle used as the draw solute is not adhered to the separation membrane 130 for the forward osmosis of the forward osmosis module 100, and thus, the flux can be maintained over certain level.

The feed water is concentrated while passing the feed-water side 110 of the forward osmosis module 100 and is discharged to the feed water tank 200 through a feed-water outlet 220. The draw solution is diluted while passing the draw-solution side 120 by the water flowed into the draw-solution side 120 and flows into the draw-solution separation device 300 through the draw-solution outlet 320. In the draw-solution separation device 300, clean water is separated from the draw solution and moves to the outside through a treated-water outlet 330. The concentrated draw solution flows into the draw-solution side 120 of the forward osmosis module 100 again through the draw-solution inlet 310.

Figure 2:
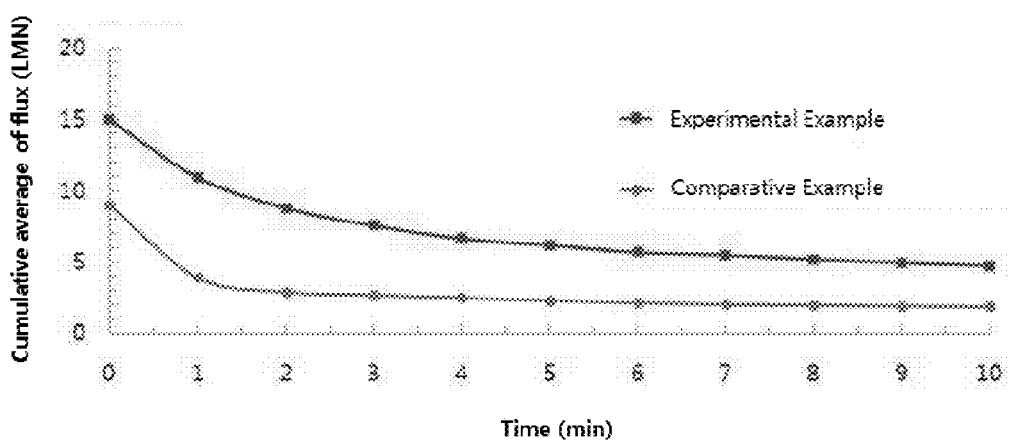
FIG. 2 is a graph for illustrating a flux variation of the water treatment system of the forward osmosis type according to the embodiment of the invention.

FIG. 2 is a graph for illustrating a flux variation of the water treatment system of the forward osmosis type according to the embodiment of the invention.

The method for obtaining the experimental result of FIG. 2 was carried out as follows.

Experimental Example

Flux Variation Measurement

First, a deionized solution was injected into a feed water tank, and a draw solution including magnetic nano particles (citrate-coated $Fe_3O_4$ magnetic particles were used) and a deionized solution was injected into a draw solution tank. Since Experimental Example focused on measuring the flux variation of the forward osmosis module, the draw solution tank was used instead of the draw-solution separation device 300. The amount of the magnetic nano particles was 2 ml (milliliter).

Next, a feed-water side cell and a draw-solution side cell were assembled together, and a separation membrane for forward osmosis was installed between the feed-water side cell and the draw-solution side cell. The separation membrane of CTA (cellulose triacetate) made by Hydration Technology Inc. (HTI) was used for the separation membrane for the forward osmosis.

And then, a feed-water inlet and a feed-water outlet were connected to the feed-water side, and a draw-solution inlet and the draw-solution outlet were connected to the draw-solution side.

Next, a first magnet (a permanent magnet) was installed by attaching the first magnet to an outside surface of the feed-water side and a second magnet (a permanent magnet) was installed by attaching the second magnet to an inner surface of the draw-solution side so that same poles of the first magnet and the second magnet face each other. Then, repulsive force between the first magnet and the second magnet were generated.

Next, the deionized solution in the feed water tank was injected into the feed-water side of the forward osmosis module through the feed-water inlet, and the draw solution in the draw solution tank where the magnetic nano particle and the deionized solution were mixed was injected into the draw-solution side through the draw-solution inlet.

And then, the deionized solution flowing into the feed-water side of the forward osmosis module was discharged into the feed water tank through the draw-solution outlet, and the draw solution where the magnetic nano particle and the deionized solution were mixed flowing draw-solution side was discharged into the draw solution tank through the draw-solution outlet.

A position of the first magnet positioned at the outer surface of the feed-water side was adjusted in order to effectively control and prevent a membrane pollution phenomenon which might be induced by the draw solution including the magnetic nano particle and the deionized solution mixed with each other and circulating through the draw-solution side of the forward osmosis module.

The deionized solution circulating the draw-solution side of the forward osmosis module and the feed water tank penetrated the separation membrane for the forward osmosis and moved to the draw-solution side by the osmotic pressure induced by draw solution where the magnetic nano particle and the deionized solution were mixed. In this instance, the flux penetrating the separation membrane was measured.

Comparative Example

Control Experiment (or Black Test)

In Comparative Example, an experiment was performed according to the process same as that of Experimental Example except that the first magnet and the second magnet were not used. A draw solution that magnetic nano particles (citrate-coated $Fe_3O_4$ magnetic particles were used) and an amount of the magnetic nano particles was 2 ml (milliliter).

Referring to FIG. 2, it can be seen that an initial flux was noticeably high in the embodiment of the invention, compared to the control experiment (Comparative Example). That is, although the magnetic nano particle of the same amount was used, the initial flux was 15 LMH in the embodiment of the invention while the initial flux was 9 LMH in the control experiment. Thus, it can be seen that the pollution phenomenon (that the draw solute is adhered to the separation membrane at the operation start time in the water treatment system of the forward osmosis type) can be effectively prevented in the embodiment of the invention.

Also, according to the result of FIG. 2, it can be seen that the flux was 5 LMH in the embodiment of the invention while the initial flux was 2 LMH in the control experiment when the operation time of the water treatment system of the forward osmosis type passes. It can be seen that the flux of the embodiment of the invention was two-and-a-half times more than that of the control experiment after a predetermined or considerable time.

Therefore, according to the invention, the magnetic particle can be effectively controlled. Particularly, as shown in the embodiment, the magnetic particle used as the draw solute can be effectively prevented from being adhered to the surface of the separation membrane from the operation start time. Thus, a water purifying velocity (that is, a flux) over predetermined velocity can be maintained for a long time.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A water treatment system of a forward osmosis type, wherein the water treatment system comprising a forward osmosis module being divided into an feed-water side and a draw-solution side by a separation membrane, and wherein the water treatment system using a draw solution including a magnetic particle as an osmotic-induced solute, wherein a first magnet is positioned at one area of the feed-water side of the forward osmosis module, wherein a second magnet is positioned at one area of the draw-solution side of the forward osmosis module, wherein a distance between the first magnet and the separation membrane of the forward osmosis module is larger than a distance between the second magnet and the separation membrane of the forward osmosis module, and wherein the magnetic particle in the draw solution is positioned apart from the separation membrane by a repulsive force between the first magnet and the second magnet.

2. The water treatment system according to claim 1, wherein the first magnet includes a permanent magnet or an electromagnet.

3. The water treatment system according to claim 1, wherein the second magnet includes a permanent magnet or an electromagnet.

4. The water treatment system according to claim 1, wherein the first magnet is positioned at one area outside the feed-water side of the forward osmosis module.

5. The water treatment system according to claim 1, wherein the second magnet is positioned at one area inside the draw-solution side of the forward osmosis module.

6. The water treatment system according to claim 1, wherein the magnetic particle includes a magnetic nano particle.

7. A control method of a water treatment system of a forward osmosis type, wherein the control method controls the water treatment system of the forward osmosis type according to claim 1, wherein the magnetic particle is positioned apart from the separation membrane for a period of time and a flux is maintained over certain level.

* * * * *